(12) United States Patent
Kervec et al.

(10) Patent No.: US 8,223,839 B2
(45) Date of Patent: Jul. 17, 2012

(54) INTERPOLATION METHOD FOR A MOTION COMPENSATED IMAGE AND DEVICE FOR THE IMPLEMENTATION OF SAID METHOD

(75) Inventors: Jonathan Kervec, Paimpont (FR); Hassane Guermoud, Rennes (FR); Didier Doyen, La Bouexiere (FR)

(73) Assignee: Thomson Licensing, Boulogne-Billancourt (FR)

( * ) Notice: Subject to any disclaimer, the term of this patent is extended or adjusted under 35 U.S.C. 154(b) by 1173 days.

(21) Appl. No.: 11/906,909

(22) Filed: Oct. 4, 2007

(65) Prior Publication Data

US 2008/0089419 A1 Apr. 17, 2008

(30) Foreign Application Priority Data

Oct. 12, 2006 (FR) ...................... 0654213

(51) Int. Cl.
*H04N 11/02* (2006.01)
(52) U.S. Cl. .............. 375/240.12; 375/240.16
(58) Field of Classification Search .......... 375/240.01, 375/240.02, 240.12, 240.16
See application file for complete search history.

(56) References Cited

U.S. PATENT DOCUMENTS

| | | | |
|---|---|---|---|
| 5,796,437 A * | 8/1998 | Muraji et al. ................. | 348/452 |
| 6,377,621 B2 * | 4/2002 | Borer ........................... | 375/240 |
| 7,039,109 B2 * | 5/2006 | Pelagotti et al. ........... | 375/240.16 |
| 7,408,986 B2 * | 8/2008 | Winder ...................... | 375/240.12 |
| 7,535,517 B2 * | 5/2009 | Zhou et al. .................. | 348/701 |
| 7,852,375 B2 * | 12/2010 | Vella et al. ................ | 348/208.99 |
| 2002/0171759 A1 | 11/2002 | Hanjojo | |
| 2004/0076333 A1 | 4/2004 | Zhang et al. | |
| 2004/0151249 A1 * | 8/2004 | Morel ....................... | 375/240.16 |
| 2004/0252230 A1 | 12/2004 | Winder | |
| 2005/0276328 A1 * | 12/2005 | Sakamoto ................ | 375/240.16 |
| 2009/0316784 A1 * | 12/2009 | Kervec et al. ........... | 375/240.16 |

FOREIGN PATENT DOCUMENTS

| AU | 2003264647 | 7/2004 |
|---|---|---|
| CN | 1512766 | 7/2004 |

OTHER PUBLICATIONS

Ozkan M. K. et al.: "Motion-adaptive weighted averaging for temporal filtering of noisy image sequences" Proceedings of the SPIE—The International Society for Optical Engineering. vol. 1657, 1992, pp. 201-212 XP002431818.

Boyce J. M. Ed Institute of Electrical and Electronics Engineers: "Noise reduction of image sequences using adaptive motion compensated frome averaging" Digital Signal Processing 2, Estimation VLSI, San Francisco, Mar. 23, vol. 5, Conf. 17, pp. 461-464, XP010058911.

* cited by examiner

*Primary Examiner* — Ricky Ngo
*Assistant Examiner* — Christine Ng
(74) *Attorney, Agent, or Firm* — Tutunjian & Bitetto, P.C.

(57) ABSTRACT

The invention proposes a motion compensated video interpolation that is not sensitive to the errors in the motion estimation vectors. The invention proposes a motion compensated video interpolation method in which the interpolation step varies according to the amplitude and/or a reliability index of the estimated motion vector for the considered pixel. The number of pixels to be taken into account for interpolation and the weighting factors associated with these pixels are made to vary according to the amplitude and/or reliability index of the estimated motion vector.

17 Claims, 5 Drawing Sheets

Figure 1:
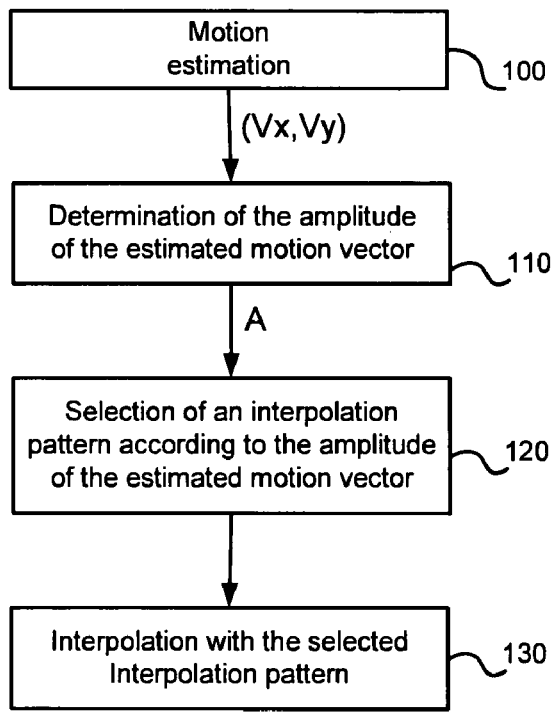

INTERPOLATION METHOD FOR A MOTION COMPENSATED IMAGE AND DEVICE FOR THE IMPLEMENTATION OF SAID METHOD

This application claims the benefit, under 35 U.S.C. §119 of EP Patent Application 0654213 filed 12 Oct. 2006.

FIELD OF THE INVENTION

The invention relates to the field of image or video processing and more specifically to the field of image interpolation with motion compensation.

TECHNOLOGICAL BACKGROUND OF THE INVENTION

A number of video processing operations call for motion compensation for improving the quality of the processing, for example in the case of a video interpolation, or for reducing data volumes, for instance in the case of a video compression. This invention relates more specifically to interpolation with motion compensation, also called motion compensated video interpolation.

A motion compensated video interpolation generally consists of a motion estimation step followed by an interpolation step.

The motion estimation consists in defining a motion vector for each of the points of the image to interpolate, the image being temporally positioned between two source images. Usually, the motion estimation step is carried out in 2 steps: a prediction step and a correction step. The prediction step consists in defining, for each one of the pixels of the image to interpolate, a motion vector from the motion vectors that have already been calculated for neighbouring pixels and from the projection of a motion vector calculated for the previous source image and including the considered pixel. The motion vectors already calculated are for example those of the n neighbouring pixels of the previous line of pixels. Prediction then consists in selecting, among the n+1 pre-calculated motion vectors, the motion vector generating the smallest DFD (Displacement Frame Difference) value. The correction step subsequently consists in rotating the selected motion vector around its axis in order to furthermore reduce, if possible, the DFD of the considered pixel.

The interpolation step, which follows the estimation step, is a bilinear interpolation in the majority of the cases. In the case of an image to interpolate $I_{int}$ between a previous source image $I_{prev}$ and a current source image $I_{curr}$, the previously defined motion vector points to an image point of each one of the source images, this image point being either a pixel, or a point located between 4 pixels. In the case of an interpolation known as "single frame", bilinear interpolation then consists in assigning to the considered P of the image $I_{int}$ a value which is a bilinear function f of the values of the 4 pixels pointed to in one of the source images (generally, the current source image) by the estimated motion vector. For example, if $V_1$, $V_2$, $V_3$ and $V_4$ designate the values of the 4 pixels near the image point pointed to by the motion vector in the current source image and if $\alpha_1$, $\alpha_2$, $\alpha_3$ and $\alpha_4$ are weighting factors representative of the proximity of said pixels to the image point, the value assigned to the pixel of the image $I_{int}$ is $$\left(\sum_{i=1}^{4} \alpha_i \cdot V_i\right) \bigg/ \sum_{i=1}^{4} \alpha_i.$$

If the motion vector points to a specific pixel among the 4 pixels, the weighting factor assigned to the other 3 pixels is nil and the value assigned to the considered pixel is the value of this specific pixel. In the case of an interpolation known as "double frame", the bilinear interpolation is done in the same manner but with 8 pixels, i.e. 4 pixels of the previous source image and 4 pixels of the current source image.

Given that motion estimation is never without errors, this type of compensated interpolation in movement contains visible defects in the image areas that disappear or appear between two successive source images since matching between pixels is not possible then.

SUMMARY OF THE INVENTION

The invention proposes a new motion compensated video interpolation that is less critical, especially for the appearance or disappearance areas of objects, than the one defined previously.

The invention proposes a motion compensated video interpolation method in which the interpolation step itself varies according to the amplitude of the estimated motion vector and/or a reliability index. The number of pixels to be taken into account for interpolation and the weighting factors associated with these pixels are made to vary according to the amplitude and/or reliability index of the estimated motion vector.

The invention therefore relates to a method for interpolating at least one pixel of a motion compensated image from the pixels of at least two source images, comprising the following steps:

for the pixel of the image to interpolate, estimating a motion vector from the source images, determining an information representative of the estimation of said vector, selecting an interpolation pattern for the pixel of the image to interpolate in accordance with said information representative of the estimation of said vector, the interpolation pattern identifying pixels in at least one of the source images and associating to each one of the identified pixels a weighting factor, and interpolating the pixel of the image from the pixels and the factors of the selected interpolation pattern.

The information representative of the estimation of the vector can be either the amplitude of the estimated vector, or a reliability index relating to the estimation of the vector, or else both of these.

According to a specific embodiment, only the amplitude of the estimated motion vector is taken into account for selecting the interpolation pattern. In this case, we can consider several levels of interpolation.

If the amplitude of the estimated motion vector of the pixel of the image to interpolate is less than or equal to a first non zero threshold, the interpolation pattern comprises the n pixels of one of the source images nearest to the spatial position of the pixel to interpolate, n being greater than or equal to 2, and the weighting factor assigned to each of the source image pixels is dependent on their proximity to the pixel to interpolate. In this case, this involves a single frame interpolation. In the case of a double frame interpolation, the interpolation pattern comprises the n pixels of each one of the source images nearest to the spatial position of the pixel to interpolate, n being greater than or equal to 2, and the weighting factor assigned to each of the source image pixels is dependent on their proximity to the pixel to interpolate and the temporal position of the image to interpolate with respect to both the source images.

If the estimated motion vector of a pixel of the image to interpolate is greater than the first threshold, the interpolation pattern consists, in the case of a single frame interpolation, of the n pixels of one of the source images nearest to the spatial position of the pixel to interpolate, n being greater than or equal to 2, and the weighting factors assigned to the source image pixels are all equal. In the case of a double frame interpolation, the interpolation pattern comprises the n pixels nearest to the spatial position of the pixel to interpolate in each one of the source images, n being greater than or equal to 2, and the weighting factor assigned to each of the source image pixels is dependent on their proximity to the pixel to interpolate and the temporal position of the image to interpolate with respect to both the source images. The number n of pixels increases appropriately with the amplitude of the estimated vector.

According to another specific embodiment, only a reliability index relating to the estimated motion vector is taken into account for selecting the interpolation pattern. This reliability index depends for instance on the variance of the motion vectors in a window of m×m pixels including the pixel to interpolate. In this case, we can also consider several levels of interpolation.

If the reliability index of the motion vector of the pixel of the image to interpolate is greater than a first reliability threshold, the interpolation pattern consists, in the case of a single frame interpolation, of the n pixels of one of the source images nearest to the spatial position of the pixel to interpolate, n being greater than or equal to 2, and the weighting factors assigned to each one of the source image pixels is dependent on their proximity to the pixel to interpolate. In the case of a double frame interpolation, the interpolation pattern comprises the n pixels of each one of the source images nearest to the spatial position of the pixel to interpolate, n being greater than or equal to 2, and the weighting factor assigned to each of the source image pixels is dependent on their proximity to the pixel to interpolate and the temporal position of the image to interpolate with respect to both the source images.

If the reliability index of the motion vector of the pixel of the image to interpolate is less than or equal to the first reliability threshold, the interpolation pattern consists, in the case of a single frame interpolation, of the n pixels of one of the source images nearest to the spatial position of the pixel to interpolate, n being greater than or equal to 2, and the weighting factors assigned to the source image pixels are equal. In the case of a double frame interpolation, the interpolation pattern comprises the n pixels nearest to the spatial position of the pixel to interpolate in each one of the source images, n being greater than or equal to 2, and the weighting factor assigned to each of the source image pixels is dependent on their proximity to the pixel to interpolate and the temporal position of the image to interpolate with respect to both the source images. The number n of pixels decreases advantageously with the value of the reliability index of the estimated vector.

According to another specific embodiment, the amplitude of the vector and the reliability index relating to the vector are taken into account for selecting the interpolation pattern.

Finally, the invention also relates to an interpolation device of at least one pixel of a motion compensated image from at least two source images, comprising:
a memory for storing the source images;
a motion estimator for estimating, for the pixel of the image to interpolate, a motion vector from the source images,
a determination circuit for determining an information representative of the estimation of said vector, and
an interpolation circuit for selecting an interpolation pattern for the pixel of the image to interpolate in accordance with said information representative of the estimation of said vector, the interpolation pattern identifying pixels in at least one of the source images and associating a weighting factor with each one of the identified pixels and interpolating the pixel from the pixels and the factors of the selected interpolation pattern.

LIST OF FIGURES

Figure 2:
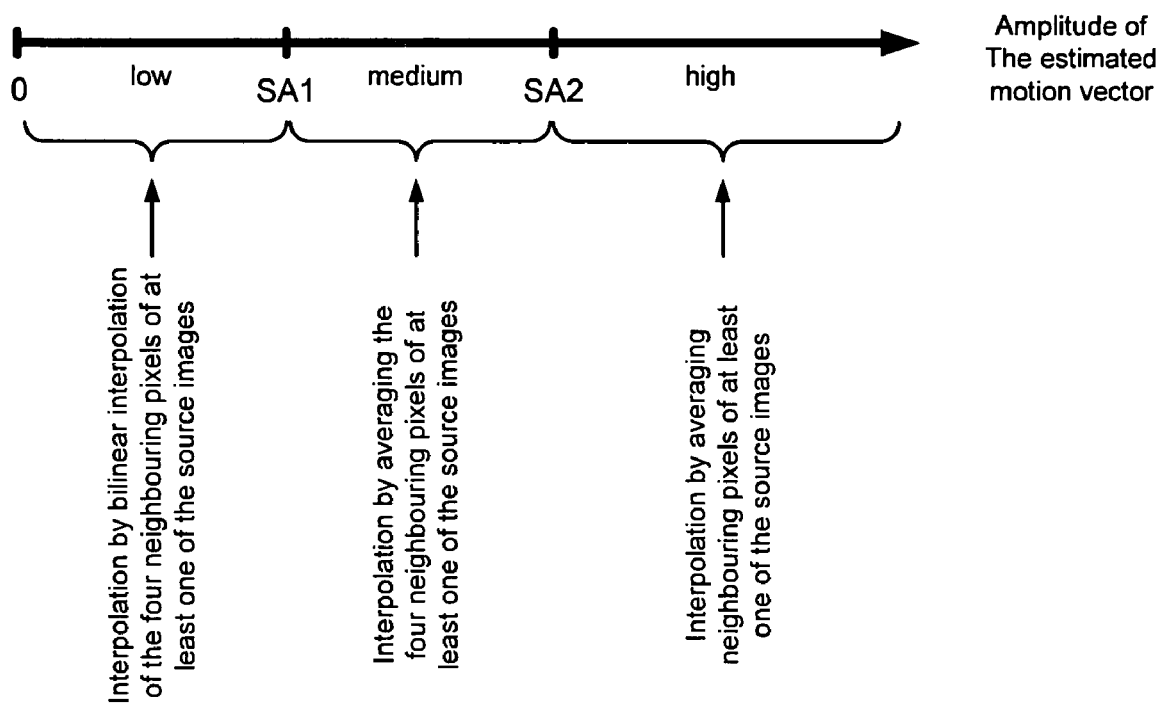
Figure 3:
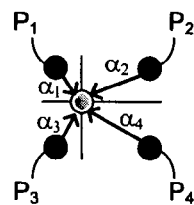
Figure 4:
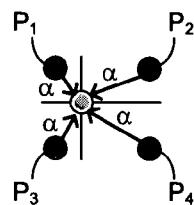
Figure 5:
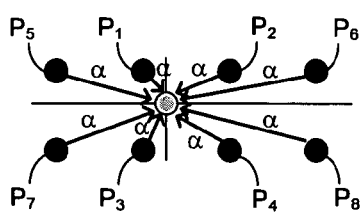
Figure 6:
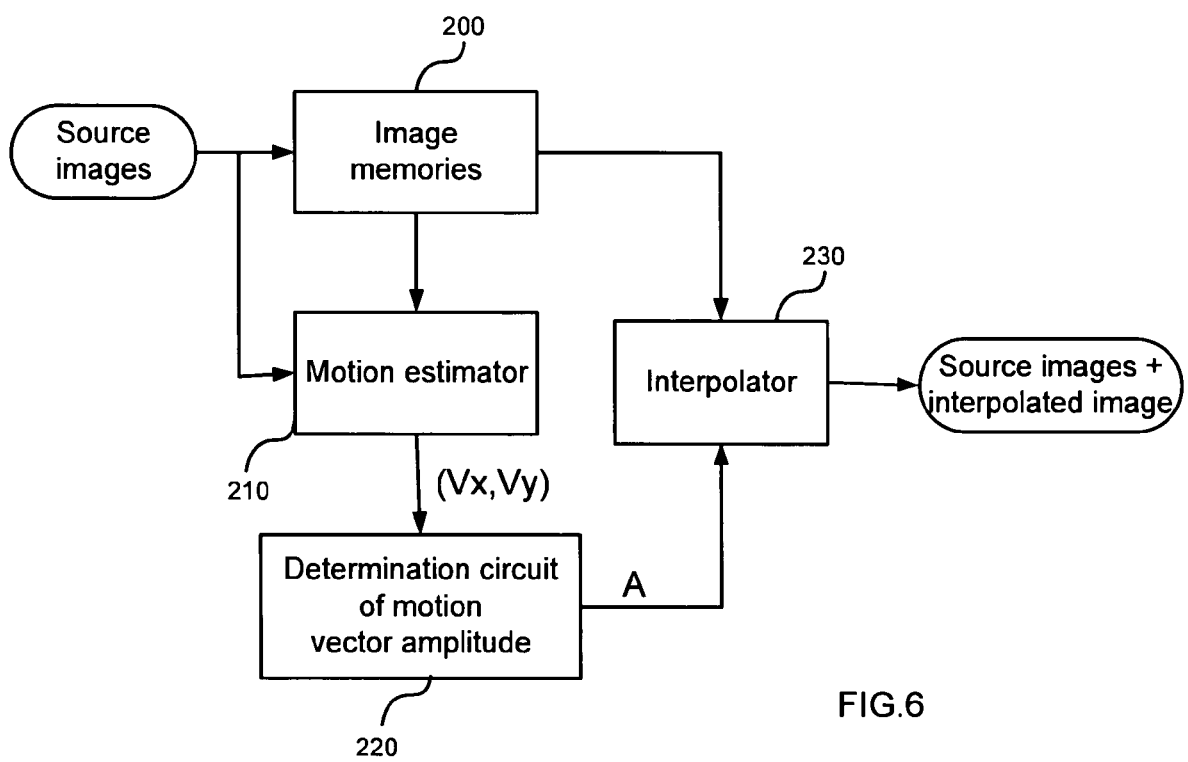
Figure 7:
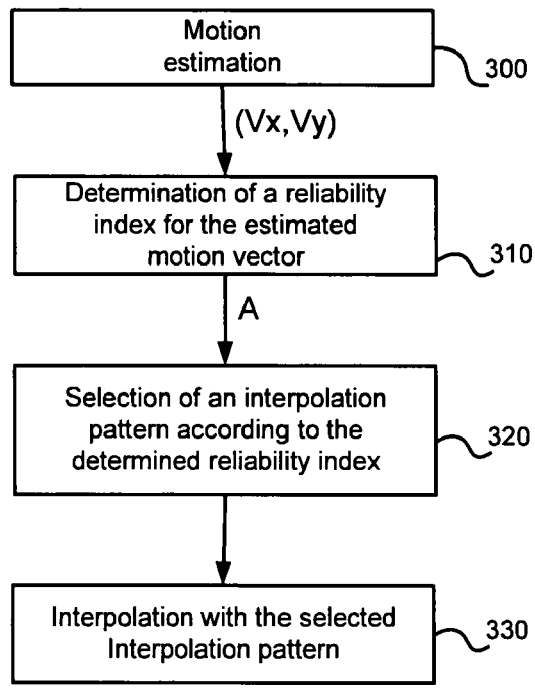
Figure 8:
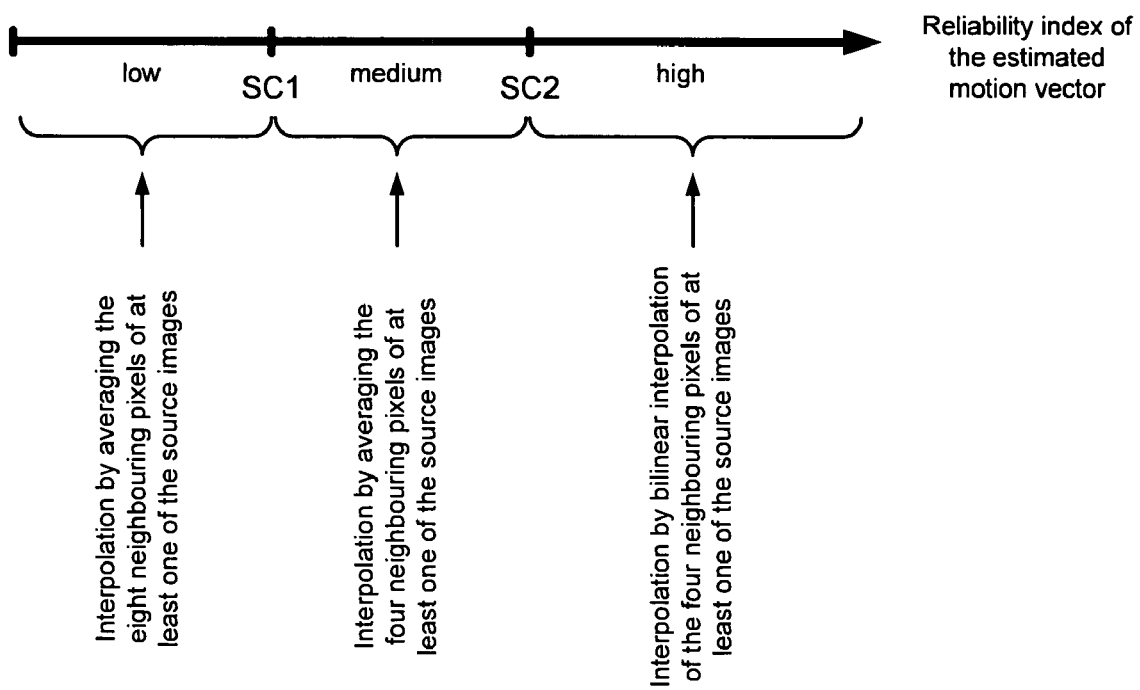
Figure 9:
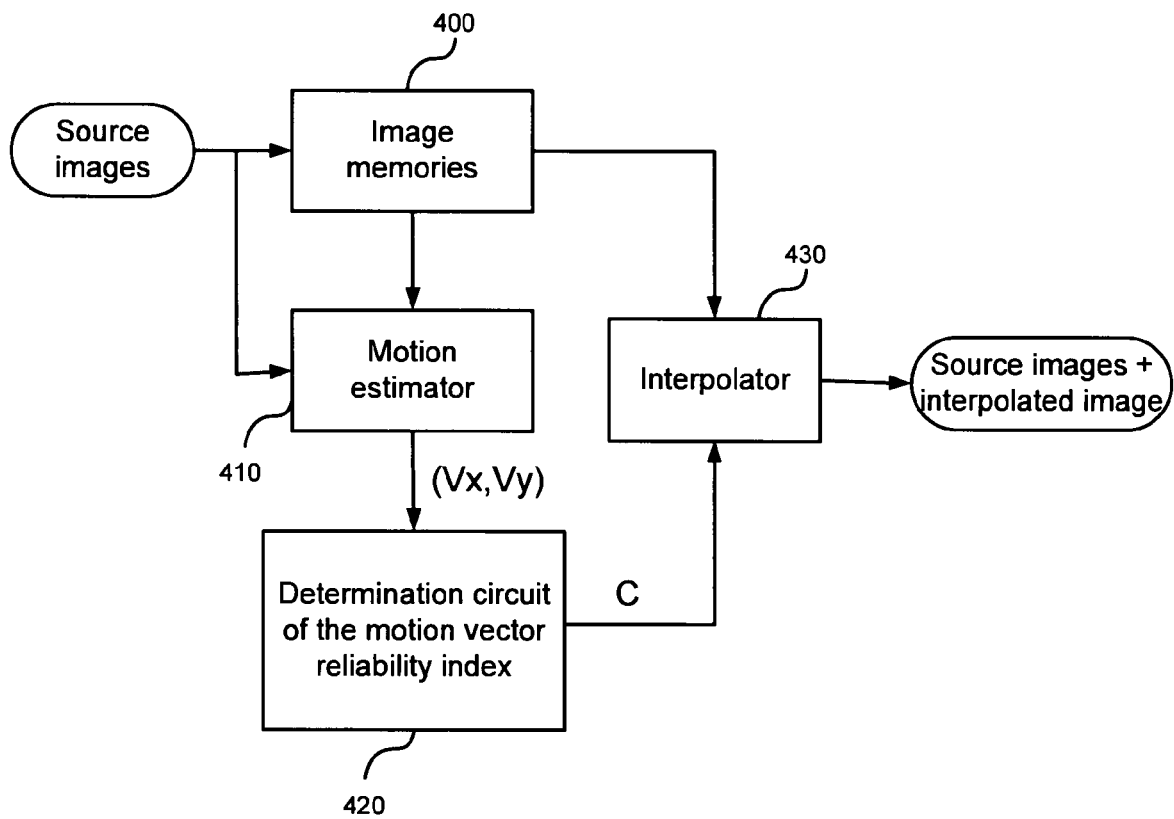
Figure 10:
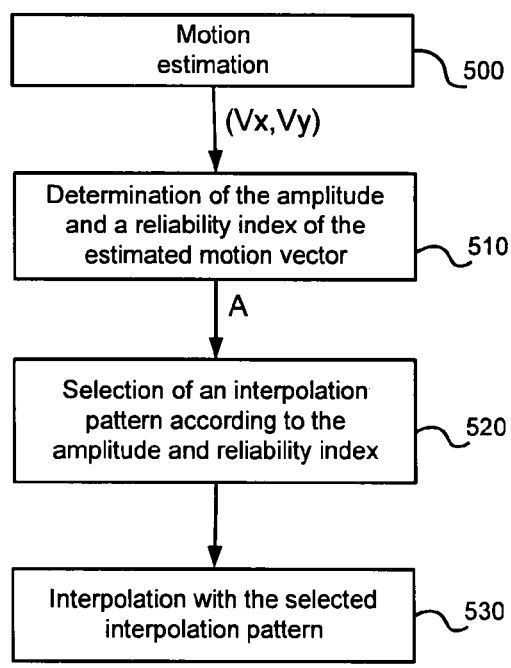
Figure 11:
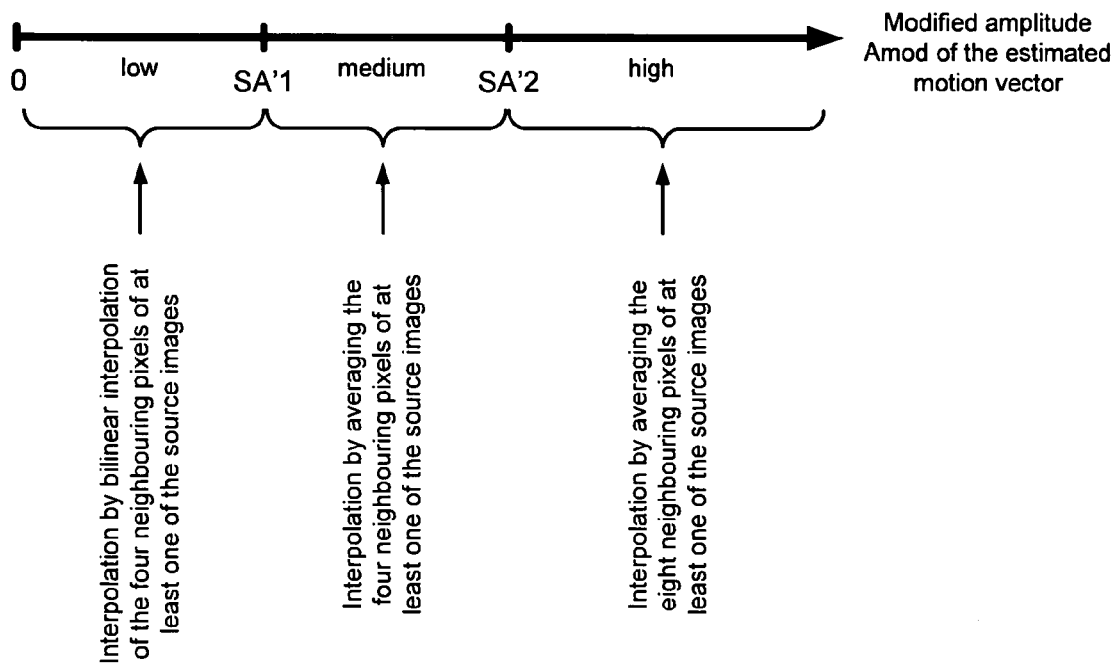
Figure 12:
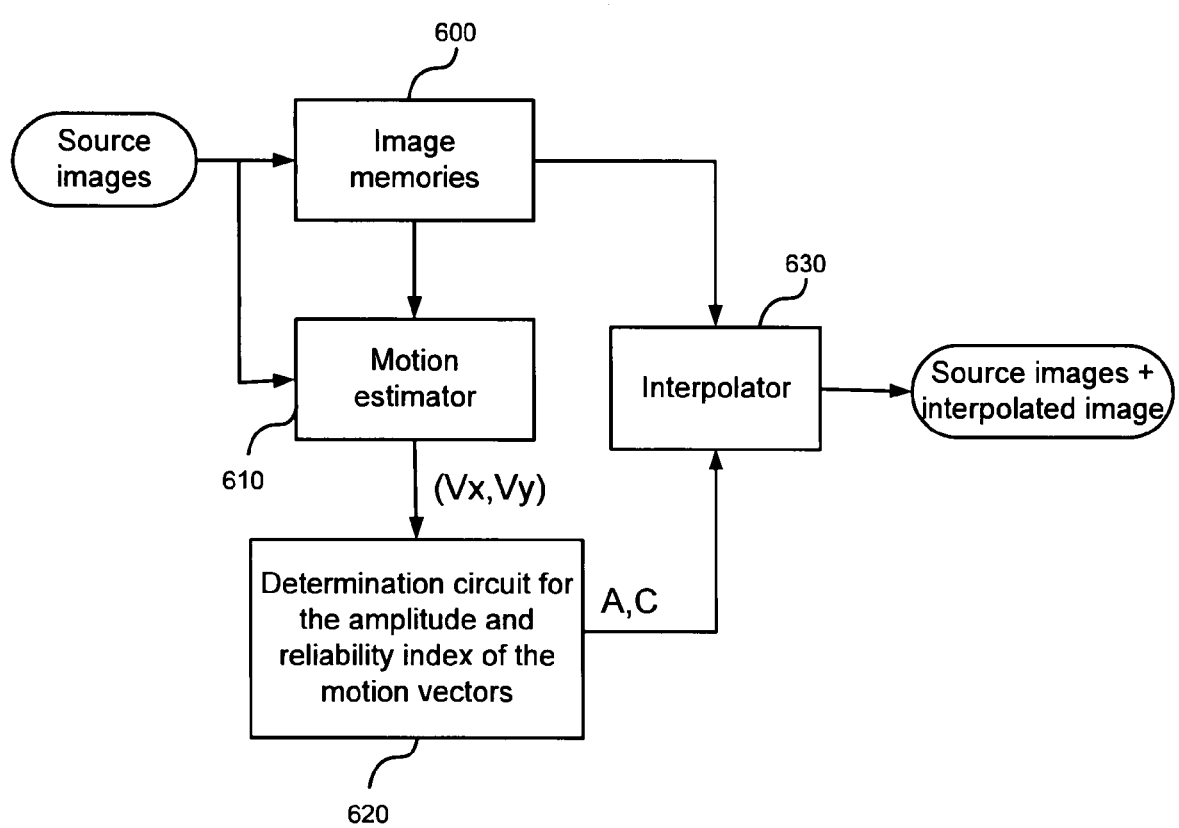

The invention will be better understood upon reading the following description, provided for information only and referring to the annexed drawings wherein:

FIG. 1 is a flowchart representing the steps of the invention method in a first embodiment based on the amplitude of the estimated motion vector, FIG. 2 is a diagram showing different interpolation patterns to be applied according to the amplitude of the estimated motion vector, FIG. 3 more specifically illustrates the interpolation in the case wherein the estimated motion vector is less than a threshold SA1, FIG. 4 more specifically illustrates the interpolation in the case wherein the estimated motion vector is between the threshold SA1 and a threshold SA2, FIG. 5 more specifically illustrates interpolation in the case wherein the estimated motion vector is greater than the threshold SA2, FIG. 6 is a device capable of implementing the method of FIG. 1, FIG. 7 is a flowchart representing the steps of the invention method in a second embodiment based on a reliability index of the estimated movement, FIG. 8 is a diagram showing different interpolation patterns to be applied according to a reliability index of the estimated motion vector, FIG. 9 is a device capable of implementing the method of FIG. 7, FIG. 10 is a flowchart representing the steps of the invention method in a third embodiment based on the amplitude and a reliability index of the estimated motion vector, FIG. 11 is a diagram showing different interpolation patterns to be applied according to the amplitude and a reliability index of the estimated motion vector, FIG. 12 is a device capable of implementing the process of FIG. 10.

DETAILED DESCRIPTION OF PREFERRED EMBODIMENTS

As previously indicated, the principle of the invention is to make the interpolation pattern vary, i.e. the number of pixels on which the interpolation and/or the associated weighting factors are based, according to the amplitude of the estimated motion vector for the considered pixel and or/a reliability index associated with the estimated motion vector.

Three embodiments are described hereinafter: a first embodiment based solely on the amplitude of the estimated motion vector, a second embodiment based solely on a reliability index of the estimated motion vector and a third embodiment combining both the above mentioned embodiments.

FIG. 1 is a flowchart representing the steps of the first embodiment of the invention method. It comprises:
- a motion estimation step 100 for estimating a motion vector (Vx,Vy) for each pixel of the image to interpolate,
- a step 110 for determining the amplitude A of the estimated motion vector ($A=\sqrt{Vx^2+Vy^2}$),
- an interpolation pattern selection step 120 for each pixel of the image to interpolate according to the amplitude of the estimated motion vector for this pixel,
- an interpolation step 130 for generating an interpolated image by using, for each pixel of this image, the interpolation pattern selected for this pixel.

FIG. 2 more specifically illustrates the interpolation step 130 and shows different types of interpolation (bilinear interpolation, interpolation by averaging) and various patterns to be applied according to the amplitude of the estimated motion vector. It can be noted that the direction of the motion vector (positive or negative motion vector) is not involved in the choice of the interpolation. In this embodiment, we use bilinear interpolations or averaging interpolations based on a plurality of neighbouring pixels. For each one of these types of interpolation, the higher the amplitude of the estimated motion vector, the greater is the increase in the number of pixels of the interpolation pattern.

If the amplitude of the motion vector is less than or equal to a first threshold SA1, the motion is considered as being low. The threshold SA1 is for instance fixed at 2 pixels (per frame). The interpolation is then for example a bilinear interpolation based on 4 pixels, these 4 pixels being the neighbouring pixels of the pixel considered in the source images. Neighbouring pixels are understood to mean the source image pixels whose spatial coordinates are close to the coordinates of the considered pixel of the image to interpolate. In the case of a single frame interpolation, only the 4 neighbouring pixels of one of the source images are used. This case is illustrated by FIG. 3. The 4 neighbouring pixels are noted $P_1$, $P_2$, $P_3$ and $P_4$, the video values associated with these 4 pixels are designated by $V_1$, $V_2$, $V_3$ and $V_4$ and the associated weighting factors are noted $\alpha_1$, $\alpha_2$, $\alpha_3$ and $\alpha_4$. The value of the factor $\alpha_i$ is a function of the distance separating the associated pixel $P_i$ and the pixel to interpolate. In the example of FIG. 3, the pixel P1 is the nearest to the pixel to interpolate and its factor, $\alpha_1$, is therefore the highest. The pixel P4 is the farthest from the pixel to interpolate and its factor, $\alpha_4$, is therefore the lowest. The value assigned to the pixel to interpolate is then equal to $$\left(\sum_{i=1}^{4} \alpha_i \cdot V_i\right) / \sum_{i=1}^{4} \alpha_i.$$

Quite obviously and as indicated previously, if the motion vector points to a specific pixel among the 4 pixels, the weighting factor assigned to the other 3 pixels is nil. In the case of a double frame interpolation, bilinear interpolation is done on the 4 neighbouring pixels of the previous source image and the 4 pixels of the current source image. If $V_1$, $V_2$, $V_3$ and $V_4$ designate the values of the 4 neighbouring pixels of the current source image and $\alpha_1$, $\alpha_2$, $\alpha_3$ and a designate the associated weighting factors and if $V'_1$, $V'_2$, $V'_3$ and $V'_4$ designate the values of the 4 neighbouring pixels of the previous source image and $\alpha'_1$, $\alpha'_2$, $\alpha'_3$ and $\alpha'_4$ designate the associated weighting factors, the value assigned to the pixel to interpolate is then equal to $\beta$.

$$\left(\left(\sum_{i=1}^{4} \alpha_i \cdot V_i\right) / \left(\sum_{i=1}^{4} \alpha_i\right)\right) + (1-\beta) \cdot \left(\left(\sum_{i=1}^{4} \alpha'_i \cdot V'_i\right) / \left(\sum_{i=1}^{4} \alpha'_i\right)\right).$$

In this formula, $\beta$ is a factor that is dependent on the temporal position of the image to interpolate with respect to the source images. If the image to interpolate is temporally positioned at mid-distance between the source images, $\beta=\frac{1}{2}$. If the image to interpolate is more of the current source image source than the previous source image, $\beta$ is greater than $\frac{1}{2}$.

If the amplitude of the estimated motion vector for a given pixel is nil, the motion vector then points to the pixel having the same spatial coordinates in one and the other of the previous and current source images. Bilinear interpolation amounts to recopying the value of the corresponding pixel, i.e. having the same spatial coordinates, from one of the previous or current source images. It may be noted that, if the previous and current source images are progressive images obtained by deinterleaving of an interleaved video sequence, it is possible that the values of the pixels which ought to be equal (since they are linked by a nil motion vector) are not so. In this case, we can still recopy one or the other of the values of the pixels pointed to by the motion vector or possibly work out the average.

If the amplitude of the motion vector is greater than the threshold SA1 and less than or equal to a second threshold SA2 greater than SA1, the motion is considered to be average. The threshold SA2 is for instance fixed at 6 pixels (per frame). Interpolation is then an averaging step based on the 4 neighbouring pixels $P_1$, $P_2$, $P_3$ and $P_4$ of the pixel considered in the source images. This case is illustrated by FIG. 4. The weighting factors of the 4 neighbouring pixels are equal ($\alpha_1=\alpha_2=\alpha_3=\alpha_4=\alpha$). In the case of a single frame interpolation, the value assigned to the pixel to interpolate is then equal to $$\left(\sum_{i=1}^{4} \alpha_i \cdot V_i\right) / \sum_{i=1}^{4} \alpha_i = \left(\sum_{i=1}^{4} \alpha_i \cdot V_i\right) / 4.$$

In the case of a double frame interpolation where ($\alpha'_1=\alpha'_2=\alpha'_3=\alpha'_4=\alpha'$), the value assigned to the pixel to interpolate is then equal to $$\beta \cdot \left(\left(\sum_{i=1}^{4} \alpha_i \cdot V_i\right) / \left(\sum_{i=1}^{4} \alpha_i\right)\right) + (1-\beta)\left(\left(\sum_{i=1}^{4} \alpha'_i \cdot V'_i\right) / \left(\sum_{i=1}^{4} \alpha'_i\right)\right) =$$

$$\left(\beta \cdot \left(\sum_{i=1}^{4} V_i\right) + (1-\beta) \cdot \left(\sum_{i=1}^{4} V'_i\right)\right) / 4.$$

Finally, if the amplitude of the motion vector is greater than the threshold SA2, the movement is considered to be high. Interpolation is then an averaging step based on 8 neighbouring pixels, for example those shown in FIG. 5. The weighting factors of the 8 neighbouring pixels are equal ($=\alpha$). In the case of a single frame interpolation, the value assigned to the pixel to interpolate is then equal to $$\left(\sum_{i=1}^{8} V_i\right) / 8.$$

In the case of a double frame interpolation, the value assigned to the pixel to interpolate is then equal to $$\left(\beta \cdot \left(\sum_{i=1}^{8} V_i\right) + (1-\beta) \cdot \left(\sum_{i=1}^{8} V_i'\right)\right) / 8.$$

FIG. 6 represents a device capable of implementing the previously described process. This device comprises at least two image memories 200 each of which is capable of memorizing a source image, namely the current source image and the previous-source image, a motion estimator 210 for determining a motion vector (Vx,Vy) for each one of the pixels of the image to interpolate from the current source image at the input of the device and the previous source image stored in one of the image memories 200, a circuit 220 for determining the amplitude A of the estimated motion vectors coming from the estimator 210 and an interpolator 230 for generating the interpolated image from the current and previous source images stored in the image memories 200 and the amplitudes A determined by the circuit 220. The interpolator 230 compares, for each pixel to interpolate, the amplitude A of the estimated motion vector for this pixel at the thresholds SA1 and SA2 and the nil value and subsequently applies the appropriate interpolation pattern.

FIG. 7 is a flowchart showing the steps of the second embodiment of the invention. It comprises:
 a motion estimation step 300 for estimating a motion vector (Vx,Vy) for each pixel of the image to interpolate,
 a step 310 for determining a reliability index C for the estimated motion vectors, and
 an interpolation pattern selection step 320 for each pixel of the image to interpolate according to the reliability index of the estimated motion vector, and
 an interpolation step 330 for generating an interpolated image by using, for each pixel of this image, the interpolation pattern selected for this pixel.

In this embodiment, the lower this reliability index, the higher is the number of pixels used by the interpolation pattern. In fact, the interpolated image can be made more blurred when we have less reliability in the value of the estimated motion vector. This reliability index is determined for instance by analyzing the dispersion of the value of the motion vectors in an image area including the considered pixel. The more dispersed the values of the motion vectors in this area are, the lower is the reliability index associated to the considered pixel. The reliability index C is for example inversely proportional to the variance of the motion vectors in a window of 5×5 pixels including the considered pixel:

$$C = 1 - \frac{\sum_{i=1,j=1}^{5,5} \sqrt{(Vx_{3,3} - Vx_{i,j})^2 - (Vy_{3,3} - Vy_{i,j})^2}}{24\sqrt{(2 \cdot Vx_{max})^2 + (2 \cdot Vy_{max})^2}}.$$

The second term of the equation is standardized in order to be contained between 0 and 1. The coordinate pixel (3,3) designates the current pixel. $Vx_{i,j}$ and $Vy_{i,j}$ designate respectively the horizontal and vertical components of the motion vector of the pixel (i,j). $Vx_{max}$ and $Vy_{max}$ designate the maximum horizontal and vertical components of the motion vectors. In the case of an 8-bit coding of each of these components, $Vx_{max} = Vy_{max} = 255$.

FIG. 8 more specifically illustrates the interpolation step 330 and shows examples of interpolation to apply according to the value of the reliability index associated with the estimated motion vector.

If the value of the reliability index is less than or equal to a first threshold SC1, the reliability index is considered as being low. Interpolation is then for example an averaging interpolation based on 8 pixels, these 8 pixels being the neighbouring pixels of the pixel considered in the source images. In the case of a single frame interpolation, only the 8 neighbouring pixels of one of the source images are used. If we reuse the notations defined for the first embodiment compared with FIGS. 2 to 5, the value assigned to the pixel to interpolate is then equal to $$\left(\sum_{i=1}^{8} \alpha \cdot V_i\right) / \sum_{i=1}^{8} \alpha = \left(\sum_{i=1}^{8} V_i\right) / 8.$$

In the case of a double frame interpolation, interpolation is done on the 8 neighbouring pixels of the previous source image and the 8 pixels of the current source image. The value assigned to the pixel to interpolate is then equal to $$\left(\beta \cdot \left(\sum_{i=1}^{8} V_i\right) + (1-\beta) \cdot \left(\sum_{i=1}^{8} V_i'\right)\right) / 8.$$

If the value of the reliability index is greater than the threshold SC1 and less than or equal to a second threshold SC2 greater than SC1, the reliability index is considered as being medium. Interpolation is then for example an averaging interpolation based on 4 pixels, these 4 pixels being the neighbouring pixels of the pixel considered in the source images. In the case of a single frame interpolation, only the 4 neighbouring pixels of one of the source images are used. If we reuse the notations defined for the first embodiment in relation to FIGS. 2 to 5, the value assigned to the pixel to interpolate is then equal to $$\left(\sum_{i=1}^{4} \alpha \cdot V_i\right) / \sum_{i=1}^{4} \alpha = \left(\sum_{i=1}^{4} V_i\right) / 4.$$

In the case of a double frame interpolation, interpolation is done on the 4 neighbouring pixels of the previous source image and the 4 pixels of the current source image. The value assigned to the pixel to interpolate is then equal to $$\left(\beta \cdot \left(\sum_{i=1}^{4} V_i\right) + (1-\beta) \cdot \left(\sum_{i=1}^{4} V_i'\right)\right) / 4.$$

Finally, if the value of the reliability index is greater than the threshold SC2, the reliability index is considered as being strong. Interpolation is then for example a bilinear interpolation based on 4 pixels, these 4 pixels being the neighbouring pixels of the pixel considered in the source images. In the case of a single frame interpolation, only the 4 neighbouring pixels of one of the source images are used. If we take up the notations defined for the first embodiment in relation to FIGS. 2 to 5, the value assigned to the pixel to interpolate is then equal to $$\left(\sum_{i=1}^{4} \alpha_i \cdot V_i\right) \Big/ \sum_{i=1}^{4} \alpha_i.$$

In the case of a double frame interpolation, bilinear interpolation is done on the 4 neighbouring pixels of the previous source image and the 4 pixels of the current source image. The value assigned to the pixel to interpolate is then equal to $$\beta \cdot \left(\left(\sum_{i=1}^{4} \alpha_i \cdot V_i\right) \Big/ \left(\sum_{i=1}^{4} \alpha_i\right)\right) + (1-\beta) \cdot \left(\left(\sum_{i=1}^{4} \alpha_i' \cdot V_i'\right) \Big/ \left(\sum_{i=1}^{4} \alpha_i'\right)\right).$$

FIG. 9 represents a device capable of implementing the previously described method. This device comprises at least two image memories 400 each of which is capable of memorizing a source image, namely the current source image and the previous source image, a motion estimator 410 for determining a motion vector for each one of the pixels of the image to interpolate from the current source image at the input of the device and from the previous source image in one of the image memories 400, a circuit 420 for determining a reliability index C for each of the estimated motion vectors coming from the estimator 410 and an interpolator 430 for generating the interpolated image from the current and previous source images stored in the image memories 400 and the reliability indices C determined by the circuit 420. The interpolator 430, compares, for each pixel to interpolate, the reliability index C of the estimated motion vector for this pixel at the thresholds SC1 and SC2 and subsequently applies the appropriate interpolation pattern.

FIG. 10 is a flowchart showing the steps of an embodiment of the invention method in which the interpolation pattern is selected according to the amplitude A and the reliability index C of the estimated motion vector. It comprises:

a motion estimation step 500 for estimating a motion vector (Vx,Vy) for each pixel of the image to interpolate, a step 510 for determining, for each one of the estimated motion vectors, its amplitude A ($A=\sqrt{V/x^2+Vy^2}$) and a reliability index C (which is for instance the variance of the motion vectors in a window of pixels including the considered pixel as described for the second embodiment), and an interpolation pattern selection step 520 for each pixel of the image to interpolate according to the amplitude and the reliability index of the estimated motion vector, and an interpolation step 530 for generating an interpolated image by using, for each pixel of this image, the interpolation pattern selected for this pixel.

For the interpolation step 530, we calculate for instance a value, called for example modified amplitude and noted $A_{mod}$, according to which an interpolation pattern is selected. $A_{mod}$ is for example equal to $A_{mod}=A\times(1-C)$. The interpolation to be applied according to $A_{mod}$ is for example illustrated by the FIG. 10. If $A_{mod}$ is less than or equal to a first threshold SA'1, the interpolation applied is a bilinear interpolation based on the 4 neighbouring pixels of the considered pixel in one or both the source images. If $A_{mod}$ is greater than the threshold SA'1 but less than or equal to a threshold SA'2 greater than SA1, interpolation is an averaging step based on the 4 neighbouring pixels of the considered pixel in one or both the source images. Finally, if $A_{mod}$ is greater than the threshold SA2, interpolation is an averaging step based on a greater number of neighbouring pixels, for example 8 pixels.

FIG. 11 represents a device capable of implementing the process illustrated by FIG. 9. This device comprises at least two image memories 600 each of which is capable of memorizing a source image, namely the current source image and the previous source image, a motion estimator 610 for determining a motion vector (Vx,Vy) for each one of the pixels of the image to interpolate from the current source image at the input of the device and from the previous source image stored in one of the image memories 600, a circuit 620 for determining the amplitude A and the reliability index C of the estimated motion vectors coming from the estimator 610 and an interpolator 630 for generating the interpolated image from the current and previous source images stored in the image memories 600 and the amplitudes A and the reliability indices C determined by the circuit 620.

Naturally, the invention is not restricted to the previously described embodiments. Those skilled in the art will be able to foresee the use of interpolation types and interpolation patterns other than the ones presented here, by using a different number of pixels or different weighting factors.

The invention claimed is:

1. Method for interpolating at least one pixel of a motion compensated image from at least two source images, comprising the steps of:
    for said pixel of the image to interpolate, estimating a motion vector from the source images,
    determining the amplitude of the estimated motion vector;
    selecting an interpolation pattern for said pixel of the image to interpolate in accordance with said amplitude of the estimation of said vector, said interpolation pattern identifying pixels in at least one of said source images and associating to each one of said identified pixels a weighting factor, wherein, if the amplitude of the estimated motion vector of the pixel of the image to interpolate is less than or equal to a first non zero threshold, the interpolation pattern comprises the n pixels of at least one of the source images nearest to the spatial position of said pixel to interpolate, n being greater than or equal to 2, and the weighting factor assigned to each of said source image pixels is dependent on their proximity to said pixel to interpolate, and
    interpolating said pixel of the image from the identified pixels of the at least one source image and the weighting factors of the selected interpolation pattern.

2. Method according to claim 1, wherein, if the amplitude of the estimated motion vector of a pixel of the image to interpolate is greater than said first threshold, the interpolation pattern comprises the n pixels of the at least one of the source images nearest to the spatial position of said pixel to interpolate, n being greater than or equal to 2, and the weighting factors assigned to said source image pixels are equal.

3. Method according to claim 1, wherein, if the amplitude of the estimated motion vector of a pixel of the image to interpolate is greater than said first threshold, the interpolation pattern comprises the n pixels nearest to the spatial position of said pixel to interpolate in each one of the source images, n being greater than or equal to 2, and the weighting factor assigned to each of said source image pixels is dependent on their proximity to said pixel to interpolate and the temporal position of said image to interpolate with respect to both the source images.

4. Method according to claim 1, wherein the number n of pixels increases with the amplitude of the estimated vector.

5. Method according to claim 1, wherein the interpolation pattern comprises the n pixels of each one of the source images nearest to the spatial position of said pixel to interpolate, n being greater than or equal to 2, and the weighting factor assigned to each of the source image pixels is further dependent on the temporal position of said image to interpolate with respect to both the source images.

6. Method according to claim 5, wherein, if the amplitude of the estimated motion vector of a pixel of the image to interpolate is greater than said first threshold, the interpolation pattern comprises the n pixels of the at least one of the source images nearest to the spatial position of said pixel to interpolate, n being greater than or equal to 2, and the weighting factors assigned to said source image pixels are equal.

7. Method according to claim 5, wherein, if the amplitude of the estimated motion vector of a pixel of the image to interpolate is greater than said first threshold, the interpolation pattern comprises the n pixels nearest to the spatial position of said pixel to interpolate in each one of the source images, n being greater than or equal to 2, and the weighting factor assigned to each of said source image pixels is dependent on their proximity to said pixel to interpolate and the temporal position of said image to interpolate with respect to both the source images.

8. Method according to claim 5, wherein the number n of pixels increases with the amplitude of the estimated vector.

9. A method for interpolating at least one pixel of a motion compensated image from at least two source images, comprising the steps of:
for said pixel of the image to interpolate, estimating a motion vector from the source images,
determining a reliability index relating to the estimation of said motion vector,
selecting an interpolation pattern for said pixel of the image to interpolate in accordance with said reliability index of the estimation of said motion vector, said selected interpolation pattern identifying pixels in at least one of said source images and associating to each one of said identified pixels a weighting factor, wherein, if the reliability index of the motion vector of said pixel of the image to interpolate is greater than a first reliability threshold, the interpolation pattern comprises the n pixels of at least one of the source images nearest to the spatial position of said pixel to interpolate, n being greater than or equal to 2, and the weighting factors assigned to each of said source image pixels is dependent on their proximity to said pixel to interpolate, and
interpolating said pixel of the image from the identified pixels of the at least one source image and the weighting factors of the selected interpolation pattern.

10. Method according to claim 9, wherein, if the reliability index of the motion vector of said pixel of the image to interpolate is less than or equal to said first reliability threshold, the interpolation pattern comprises the n pixels of the at least one of the source images nearest to the spatial position of said pixel to interpolate, n being greater than or equal to 2, and the weighting factors assigned to said source image pixels are equal.

11. Method according to claim 9, wherein, if the reliability index of the motion vector of said pixel of the image to interpolate is less than or equal to said first reliability threshold, the interpolation pattern comprises the n pixels nearest to the spatial position of said pixel to interpolate in each one of the source images, n being greater than or equal to 2, and the weighting factor assigned to each of said source image pixels is dependent on their proximity to said pixel to interpolate and the temporal position of said image to interpolate with respect to both the source images.

12. Method according to claim 9, wherein the number n of pixels decreases with the value of the reliability index of the estimated vector.

13. Method according to claim 9, wherein, the interpolation pattern comprises the n pixels of each one of the source images nearest to the spatial position of said pixel to interpolate, n being greater than or equal to 2, and the weighting factor assigned to each of said source image pixels is further dependent on the temporal position of said image to interpolate with respect to both the source images.

14. Method according to claim 13, wherein, if the reliability index of the motion vector of said pixel of the image to interpolate is less than or equal to said first reliability threshold, the interpolation pattern comprises the n pixels of the at least one of the source images nearest to the spatial position of said pixel to interpolate, n being greater than or equal to 2, and the weighting factors assigned to said source image pixels are equal.

15. Method according to claim 13, wherein, if the reliability index of the motion vector of said pixel of the image to interpolate is less than or equal to said first reliability threshold, the interpolation pattern comprises the n pixels nearest to the spatial position of said pixel to interpolate in each one of the source images, n being greater than or equal to 2, and the weighting factor assigned to each of said source image pixels is dependent on their proximity to said pixel to interpolate and the temporal position of said image to interpolate with respect to both the source images.

16. Method according to claim 13, wherein the number n of pixels decreases with the value of the reliability index of the estimated vector.

17. Method according to claim 9, wherein the reliability index relating to the estimation of a motion vector for a pixel to interpolate is dependent on the variance of the motion vectors in a window of m×m pixels including said pixel.

* * * * *